United States Patent
Sarwer et al.

(10) Patent No.: US 11,889,091 B2
(45) Date of Patent: Jan. 30, 2024

(54) METHODS FOR PROCESSING CHROMA SIGNALS

(71) Applicant: ALIBABA GROUP HOLDING LIMITED, Grand Cayman (KY)

(72) Inventors: Mohammed Golam Sarwer, Cupertino, CA (US); Jiancong Luo, Skillman, NJ (US); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/173,508

(22) Filed: Feb. 11, 2021

(65) Prior Publication Data

US 2021/0266573 A1 Aug. 26, 2021

Related U.S. Application Data

(60) Provisional application No. 62/980,120, filed on Feb. 21, 2020.

(51) Int. Cl.
*H04N 19/186* (2014.01)
*H04N 19/70* (2014.01)
*H04N 19/184* (2014.01)
*H04N 19/132* (2014.01)
*H04N 19/136* (2014.01)
*H04N 19/174* (2014.01)

(52) U.S. Cl.
CPC ......... *H04N 19/186* (2014.11); *H04N 19/132* (2014.11); *H04N 19/136* (2014.11); *H04N 19/174* (2014.11); *H04N 19/184* (2014.11); *H04N 19/70* (2014.11)

(58) Field of Classification Search
CPC .. H04N 19/184; H04N 19/174; H04N 19/136; H04N 19/132; H04N 19/70; H04N 19/186
See application file for complete search history.

(56) References Cited

U.S. PATENT DOCUMENTS

| | | | | |
|---|---|---|---|---|
| 2006/0245661 | A1* | 11/2006 | Beazley | ............... H04N 19/182 375/E7.162 |
| 2013/0094572 | A1* | 4/2013 | Van der Auwera | .. H04N 19/117 375/240.03 |
| 2013/0188744 | A1* | 7/2013 | Van der Auwera | .... H04N 19/82 375/240.29 |

(Continued)

FOREIGN PATENT DOCUMENTS

| | | |
|---|---|---|
| EP | 4088464 A0 | 11/2022 |
| WO | WO 2019/160986 A1 | 8/2019 |
| WO | WO2021155834 A1 | 8/2021 |

OTHER PUBLICATIONS

Bross et al., "Versatile Video Coding (Draft 8), "JVET-Q2001-vD, 17th Meeting: Brussels, BE, Jan. 7-17, 2020, 509 pages.

(Continued)

*Primary Examiner* — Neil R Mikeska
(74) *Attorney, Agent, or Firm* — Finnegan, Henderson, Farabow, Garrett & Dunner, LLP

(57) ABSTRACT

The present disclose provides methods and systems for processing chroma signals. According to some embodiments, the method can include: receiving a sequence parameter set (SPS); and determining, based on a first flag signaled in the SPS, whether chroma residual scaling is enabled or disabled for a slice associated with the SPS.

7 Claims, 22 Drawing Sheets

(56) References Cited

U.S. PATENT DOCUMENTS

| | | | |
|---|---|---|---|
| 2014/0086303 A1* | 3/2014 | Wang | H04N 19/70 375/240.02 |
| 2015/0016512 A1 | 1/2015 | Pu et al. | |
| 2015/0304682 A1 | 10/2015 | Xu et al. | |
| 2015/0373327 A1* | 12/2015 | Zhang | H04N 19/157 375/240.03 |
| 2015/0382016 A1 | 12/2015 | Cohen et al. | |
| 2016/0100168 A1* | 4/2016 | Rapaka | H04N 19/12 375/240.03 |
| 2018/0041757 A1* | 2/2018 | Liu | H04N 19/186 |
| 2018/0270480 A1* | 9/2018 | Zhang | H04N 19/154 |
| 2019/0289332 A1* | 9/2019 | Rosewarne | H04N 19/86 |
| 2020/0020304 A1* | 1/2020 | Paterson | G02B 27/017 |
| 2020/0236381 A1* | 7/2020 | Chujoh | H04N 19/186 |
| 2021/0195247 A1* | 6/2021 | Li | H04N 19/159 |
| 2021/0258613 A1* | 8/2021 | Hsu | H04N 19/184 |
| 2021/0266550 A1* | 8/2021 | Li | H04N 19/184 |
| 2022/0007013 A1* | 1/2022 | Zhu | H04N 19/186 |

OTHER PUBLICATIONS

Chen et al., "Algorithm Description of Joint Exploration Test Model 7 (JEM 7)," JVET-G1001-v1, 7th Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/syn_HMJEMSoftware.

Segall et al., "Joint Call for Proposals on Video Compression with Capability beyond HEVC," JVET-H1002 (v6), 8th Meeting: Macao, CN, Oct. 18-24, 2017, 27 pages.

Sullivan et al., "Overview of the High Efficiency Video Coding (HEVC) Standard," IEE Transactions on Circuits and Systems for Video Technology, vol. 22, No. 12, pp. 1649-1668 (2012).

PCT International Search Report and Written Opinion dated Jul. 1, 2021, issued in corresponding International Application No. PCT/US2021/017592 (10 pgs.).

Flynn et al., "Overview of the Range Extensions for the HEVC Standard: Tools, Profiles and Performance," IEEE Transactions on Circuits and Systems for Video Technology, vol. 26, No. 1, Jan. 2016.

European Patent Office Communication issued for Application No. 21756480.6 the Supplementary European Search Report (Art. 153(7) EPC) and the European search opinion dated Jun. 23, 2023, 11 pages.

Choi et al., "AHG9: On signaling of chroma deblocking offsets in monochrome picture," JVET-R0152, 18th Meeting: by teleconference, Apr. 15-24, 2020, 4 pages.

Li et al., "AHG12: Signaling of chroma presence in PPS and APS," JVET-Q0420-v1, 17th Meeting: Brussels, BE, Jan. 7-17, 2020, 3 pages.

Sun et al., "AHG9: On signaling of deblocking parameters for coding monochrome pictures," JVET-R0078, 18th Meeting: by teleconference, Apr. 15-24, 2020, 6 pages.

* cited by examiner

Table 1: Exemplary LMCS syntax in Picture Header

| | |
|---|---|
| if( sps_lmcs_enabled_flag ) { | |
|    ph_lmcs_enabled_flag | u(1) |
|    if( ph_lmcs_enabled_flag ) { | |
|       ph_lmcs_aps_id | u(2) |
|       if( ChromaArrayType != 0 ) | |
|          ph_chroma_residual_scale_flag | u(1) |
|    } | |
| } | |

FIG. 5

Table 2: Exemplary LMCS syntax in Slice Header

| | |
|---|---|
| if( ph_lmcs_enabled_flag ) | |
|     slice_lmcs_enabled_flag | u(1) |

FIG. 6

FIG. 7: Illustration of drawback of LMCS on a picture divided into two slices Table 3: Exemplary LMCS syntax in Picture Header

| | |
|---|---|
| if( sps_lmcs_enabled_flag ) { | |
|     ph_lmcs_enabled_flag | u(1) |
|     if( ph_lmcs_enabled_flag ) { | |
|         ph_lmcs_aps_id | u(2) |
|         ~~if( ChromaArrayType != 0 )~~ | |
|             ~~ph_chroma_residual_scale_flag~~ | ~~u(1)~~ |
|     } | |
| } | |

Table 4: Exemplary LMCS syntax in Slice Header

| | |
|---|---|
| if( ph_lmcs_enabled_flag ){ | |
|   slice_lmcs_enabled_flag | u(1) |
|   if(slice_lmcs_enabled_flag && ChromaArrayType != 0 ) | |
|     slice_chroma_residual_scale_flag | u(1) |
| } | |

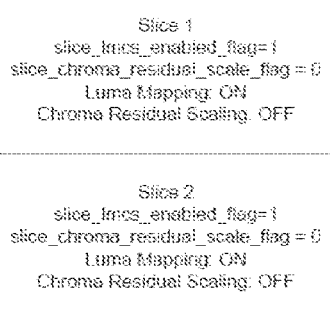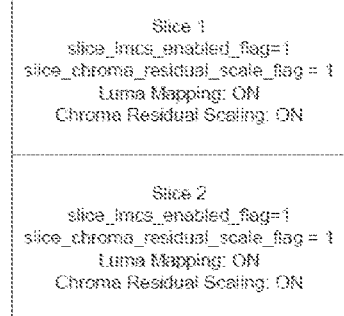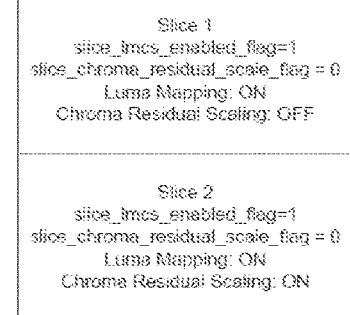
FIG. 10: Illustration of a method for processing video content with signaling luma mapping with chroma scaling Table 5: Exemplary Picture Header syntax

| | |
|---|---|
| if( sps_lmcs_enabled_flag ) { | |
|   ph_lmcs_enabled_flag | u(1) |
|   if( ph_lmcs_enabled_flag ) { | |
|     ph_lmcs_aps_id | u(2) |
|     if( ChromaArrayType != 0 ) | |
|       ph_chroma_residual_scale_flag | u(1) |
|   } | |
| } | |

FIG. 11

Table 1: Exemplary Slice Header syntax

| | |
|---|---|
| if( ph_lmcs_enabled_flag ){ | |
|   slice_lmcs_enabled_flag | u(1) |
|   if(slice_lmcs_enabled_flag && ChromaArrayType != 0 && ph_chroma_residual_scale_flag) | |
|     slice_chroma_residual_scale_flag | u(1) |
| } | |

Table 7: Exemplary Picture Header syntax

| | |
|---|---|
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       if( ChromaArrayType != 0 ){ | |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       } | |
|     } | |
|   } | |
| } | |

FIG. 13

Table 8: Exemplary Slice Header syntax

| | |
|---|---|
| if( deblocking_filter_override_enabled_flag && !dbf_info_in_ph_flag ) | |
|    slice_deblocking_filter_override_flag | u(1) |
| if( slice_deblocking_filter_override_flag ) { | |
|    slice_deblocking_filter_disabled_flag | u(1) |
|    if( !slice_deblocking_filter_disabled_flag ) { | |
|      slice_beta_offset_div2 | se(v) |
|      slice_tc_offset_div2 | se(v) |
|      if( ChromaArrayType != 0 ){ | |
|        slice_cb_beta_offset_div2 | se(v) |
|        slice_cb_tc_offset_div2 | se(v) |
|        slice_cr_beta_offset_div2 | se(v) |
|        slice_cr_tc_offset_div2 | se(v) |
|      } | |
|    } | |
| } | |

FIG. 14

Table 9: Exemplary PPS syntax

| pic_parameter_set_rbsp( ) { | Descriptor |
|---|---|
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   ............. | |
| | |
|   pps_chroma_format_idc | u(2) |
|   if( pps_chroma_format_idc = = 3 ) | |
|     pps_separate_colour_plane_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       if( ChromaArrayType != 0 ){ | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
|   } | |
| } | |

FIG. 15

Table 10: Exemplary PPS syntax of replacing pps_chroma_tool_offsets_present_flag by ChromaArrayType

| pic_parameter_set_rbsp( ) { | Descriptor |
|---|---|
| pps_pic_parameter_set_id | ue(v) |
| pps_seq_parameter_set_id | u(4) |
| mixed_nalu_types_in_pic_flag | u(1) |
| pic_width_in_luma_samples | ue(v) |
| pic_height_in_luma_samples | ue(v) |
| pps_conformance_window_flag | u(1) |
| ............... | |
| | |
| pps_chroma_format_idc | u(2) |
| if( pps_chroma_format_idc == 3 ) | |
|    pps_separate_colour_plane_flag | u(1) |
| ..... | |
| ~~pps_chroma_tool_offsets_present_flag~~ | ~~u(1)~~ |
| if( ~~pps_chroma_tool_offsets_present_flag~~ ChromaArrayType != 0 ){ | |
|    pps_cb_qp_offset | se(v) |
|    pps_cr_qp_offset | se(v) |
|    pps_joint_cbcr_qp_offset_present_flag | u(1) |
|    if( pps_joint_cbcr_qp_offset_present_flag ) | |
|      pps_joint_cbcr_qp_offset_value | se(v) |
|    pps_slice_chroma_qp_offsets_present_flag | u(1) |
|    pps_cu_chroma_qp_offset_list_enabled_flag | u(1) |
|    } | |
|    ... | |
|    } | |
| } | |

FIG. 16

Table 11: Exemplary PPS syntax

| pic_parameter_set_rbsp( ) { | Descriptor |
|---|---|
| ~~pps_chroma_tool_offsets_present_flag~~ pps_chroma_tool_present_flag | u(1) |
| if( ~~pps_chroma_tool_offsets_present_flag~~ pps_chroma_tool_present_flag ) { | |
|     pps_cb_qp_offset | se(v) |
|     pps_cr_qp_offset | se(v) |
|     pps_joint_cbcr_qp_offset_present_flag | u(1) |
|     if( pps_joint_cbcr_qp_offset_present_flag ) | |
|       pps_joint_cbcr_qp_offset_value | se(v) |
|     pps_slice_chroma_qp_offsets_present_flag | u(1) |
|     pps_cu_chroma_qp_offset_list_enabled_flag | u(1) |
| } | |
| if( pps_cu_chroma_qp_offset_list_enabled_flag ) { | |
|     chroma_qp_offset_list_len_minus1 | ue(v) |
|     for( i = 0; i <= chroma_qp_offset_list_len_minus1; i++ ) { | |
|       cb_qp_offset_list[ i ] | se(v) |
|       cr_qp_offset_list[ i ] | se(v) |
|       if( pps_joint_cbcr_qp_offset_present_flag ) | |
|         joint_cbcr_qp_offset_list[ i ] | se(v) |
|     } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       if (pps_chroma_tool_present_flag){ | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       } | |
|     } | |
| } | |
| } | |

FIG. 17

METHODS FOR PROCESSING CHROMA SIGNALS

CROSS-REFERENCE TO RELATED APPLICATIONS

The disclosure claims the benefits of priority to U.S. Provisional Application No. 62/980,120, filed Feb. 21, 2020, which is incorporated herein by reference in its entirety.

TECHNICAL FIELD

The present disclosure generally relates to video processing, and more particularly, to methods and apparatuses for signaling parameters (e.g., chroma residual scaling parameters, chroma de-blocking parameters, etc.) for coding chroma signals.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a video decoding method. The method includes: receiving a sequence parameter set (SPS); and determining, based on a first flag signaled in the SPS, whether chroma residual scaling is enabled or disabled for a slice associated with the SPS.

Embodiments of the present disclosure also provide a video encoding method. The method includes: signaling, in a sequence parameter set (SPS) associated with a slice, a first flag indicating whether chroma residual scaling is enabled or disabled for the slice.

Embodiments of the present disclosure also provide a video encoder. The video encoder includes a memory for storing a set of instructions, and at least one processor configured to execute the set of instructions to cause the system to perform: receiving a sequence parameter set (SPS); and determining, based on a first flag signaled in the SPS, whether chroma residual scaling is enabled or disabled for a slice associated with the SPS.

Embodiments of the present disclosure also provide a video decoder. The video decoder includes a memory for storing a set of instructions, and at least one processor configured to execute the set of instructions to cause the system to perform: signaling, in a sequence parameter set (SPS) associated with a slice, a first flag indicating whether chroma residual scaling is enabled or disabled for the slice.

Embodiments of the present disclosure also provide a non-transitory computer readable medium that stores a set of instructions that is executable by at least one processor of a computer system to cause the computer system to perform a method for decoding video content. The method includes: receiving a sequence parameter set (SPS); and determining, based on a first flag signaled in the SPS, whether chroma residual scaling is enabled or disabled for a slice associated with the SPS.

Embodiments of the present disclosure also provide a non-transitory computer readable medium that stores a set of instructions that is executable by at least one processor of a computer system to cause the computer system to perform a method for encoding video content. The method includes: signaling, in a sequence parameter set (SPS) associated with a slice, a first flag indicating whether chroma residual scaling is enabled or disabled for the slice.

Embodiments of the present disclosure provide a video processing method. The method includes: determining whether a video sequence is monochrome; and in response to a determination that the video sequence is not monochrome, signaling chroma de-blocking parameters in a bitstream associated with the video sequence, wherein when the video sequence is monochrome, no chroma de-blocking parameter is signaled in the bitstream.

Embodiments of the present disclosure also provide a video processing apparatus. The apparatus includes a memory for storing a set of instructions, and at least one processor configured to execute the set of instructions to cause the system to perform; determining whether a video sequence is monochrome; and in response to a determination that the video sequence is not monochrome, signaling chroma de-blocking parameters in a bitstream associated with the video sequence, wherein when the video sequence is monochrome, no chroma de-blocking parameter is signaled in the bitstream.

Embodiments of the present disclosure also provide a non-transitory computer readable medium that stores a set of instructions that is executable by at least one processor of a computer system to cause the computer system to perform a method for processing video content. The method includes: determining whether a video sequence is monochrome; and in response to a determination that the video sequence is not monochrome, signaling chroma de-blocking parameters in a bitstream associated with the video sequence, wherein when the video sequence is monochrome, no chroma de-blocking parameter is signaled in the bitstream.

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 is a syntax table showing exemplary Picture Header (PH) level luma mapping chroma scaling (LMCS) syntax, consistent with embodiments of the disclosure.

FIG. 6 is a syntax table showing exemplary slice level LMCS syntax, consistent with embodiments of the disclosure.

FIG. 8 is a syntax table showing exemplary PH level LMCS syntax, consistent with embodiments of the disclosure.

FIG. 9 is a syntax table showing exemplary slice level LMCS syntax, consistent with embodiments of the disclosure.

FIG. 10 illustrates an example of implementing the syntax shown in FIGS. 8 and 9, consistent with embodiments of the disclosure.

FIG. 11 is a syntax table showing exemplary PH level LMCS syntax, consistent with embodiments of the disclosure.

FIG. 12 is a syntax table showing exemplary slice level LMCS syntax, consistent with embodiments of the disclosure.

FIG. 13 is a syntax table showing exemplary PH level syntax for signaling chroma de-blocking parameters, consistent with embodiments of the disclosure.

FIG. 14 is a syntax table showing exemplary slice level syntax for signaling chroma de-blocking parameters, consistent with embodiments of the disclosure.

FIG. 15 is a syntax table showing exemplary Picture Parameter Set (PPS) syntax for signaling chroma de-clocking parameters, consistent with embodiments of the disclosure.

FIG. 16 is a syntax table showing exemplary PPS syntax in which pps_chroma_tool_offsets_present_flag is replaced by ChromaArrayType, consistent with embodiments of the disclosure.

FIG. 17 is a syntax table showing exemplary PPS syntax for signaling chroma de-clocking parameters, consistent with embodiments of the disclosure.

DETAILED DESCRIPTION

Figure 1:
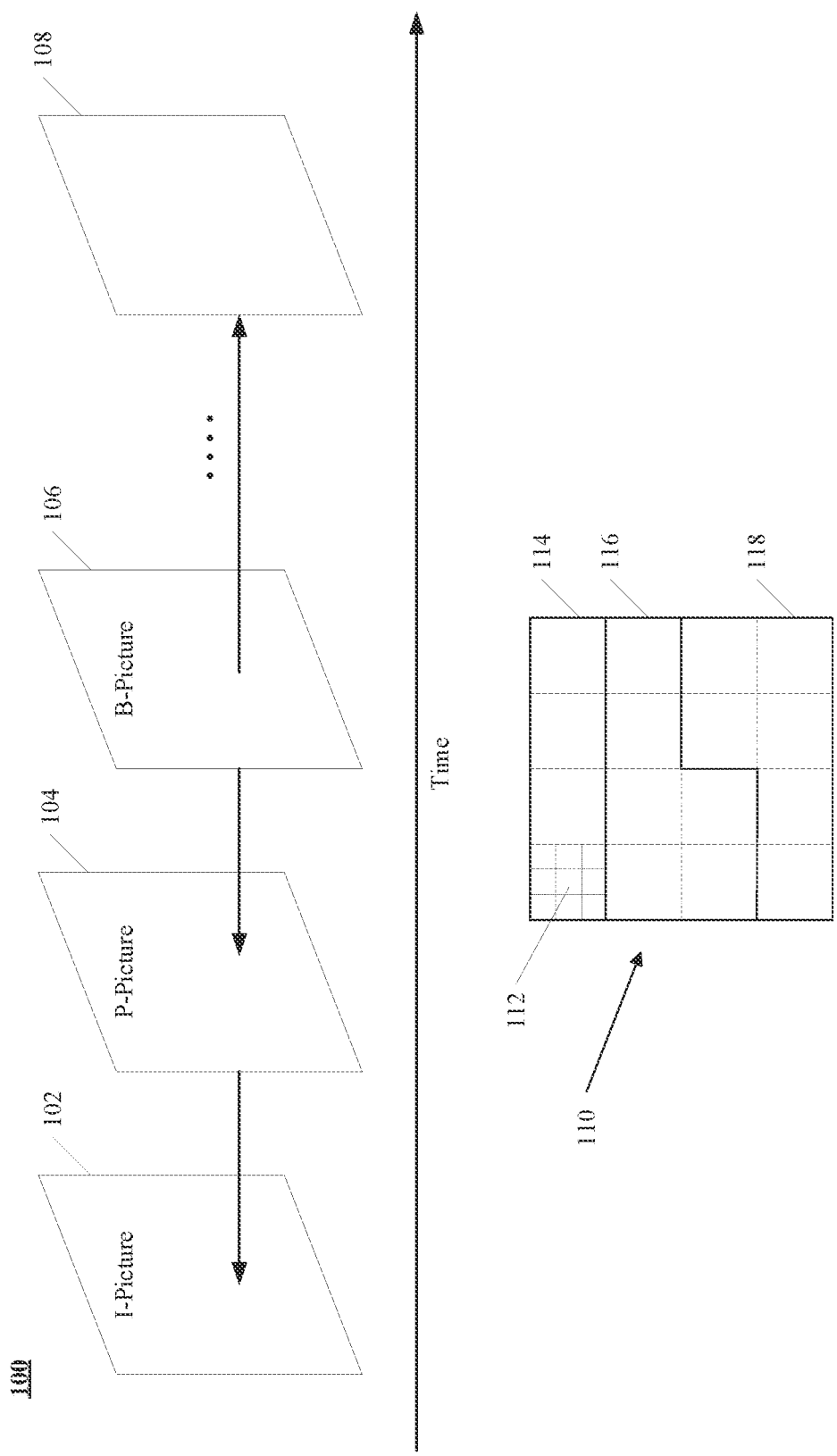
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
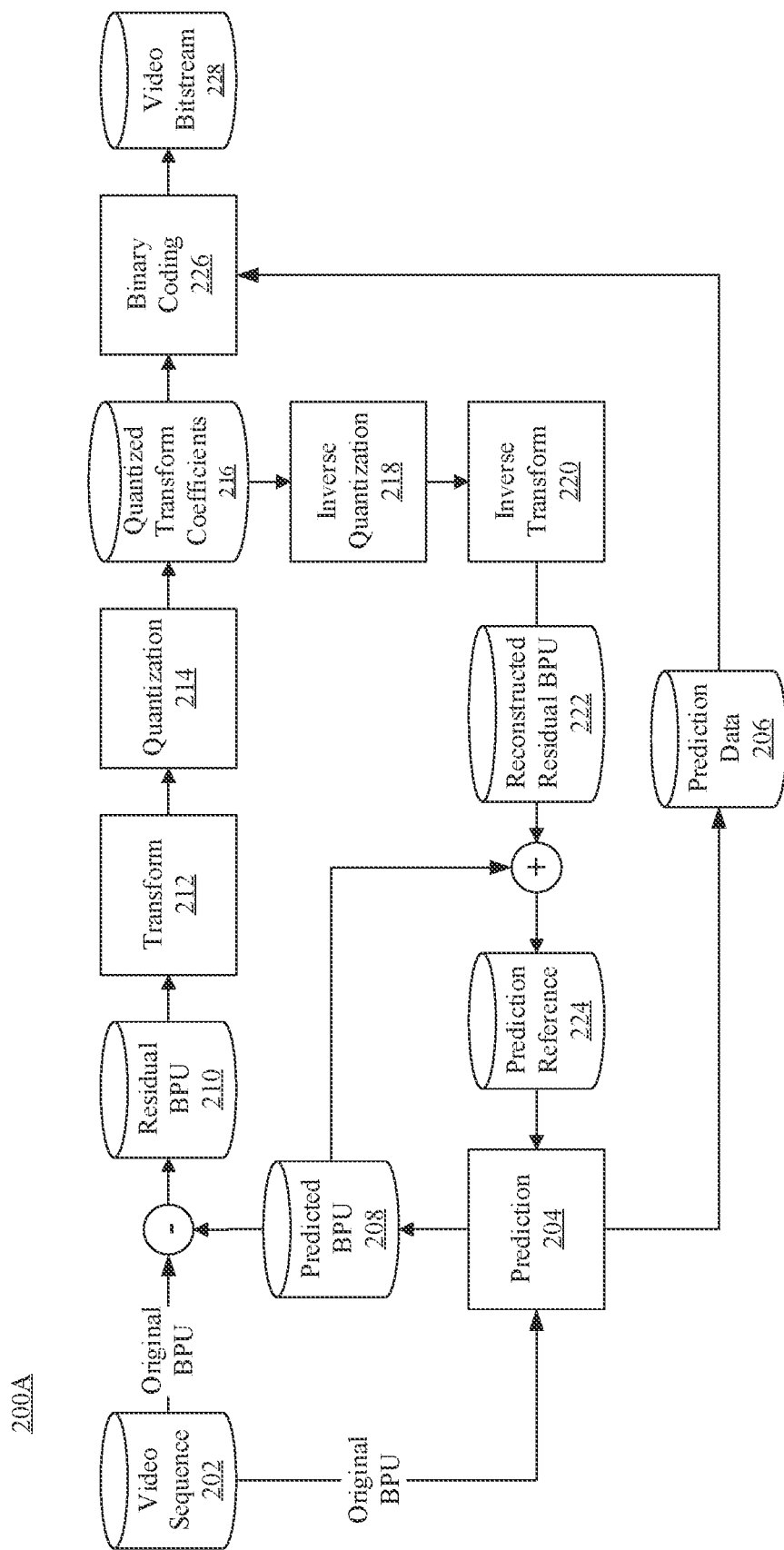
FIG. 2A is a schematic diagram illustrating an exemplary encoding process of a hybrid video coding system, consistent with embodiments of the disclosure.
Figure 2B:
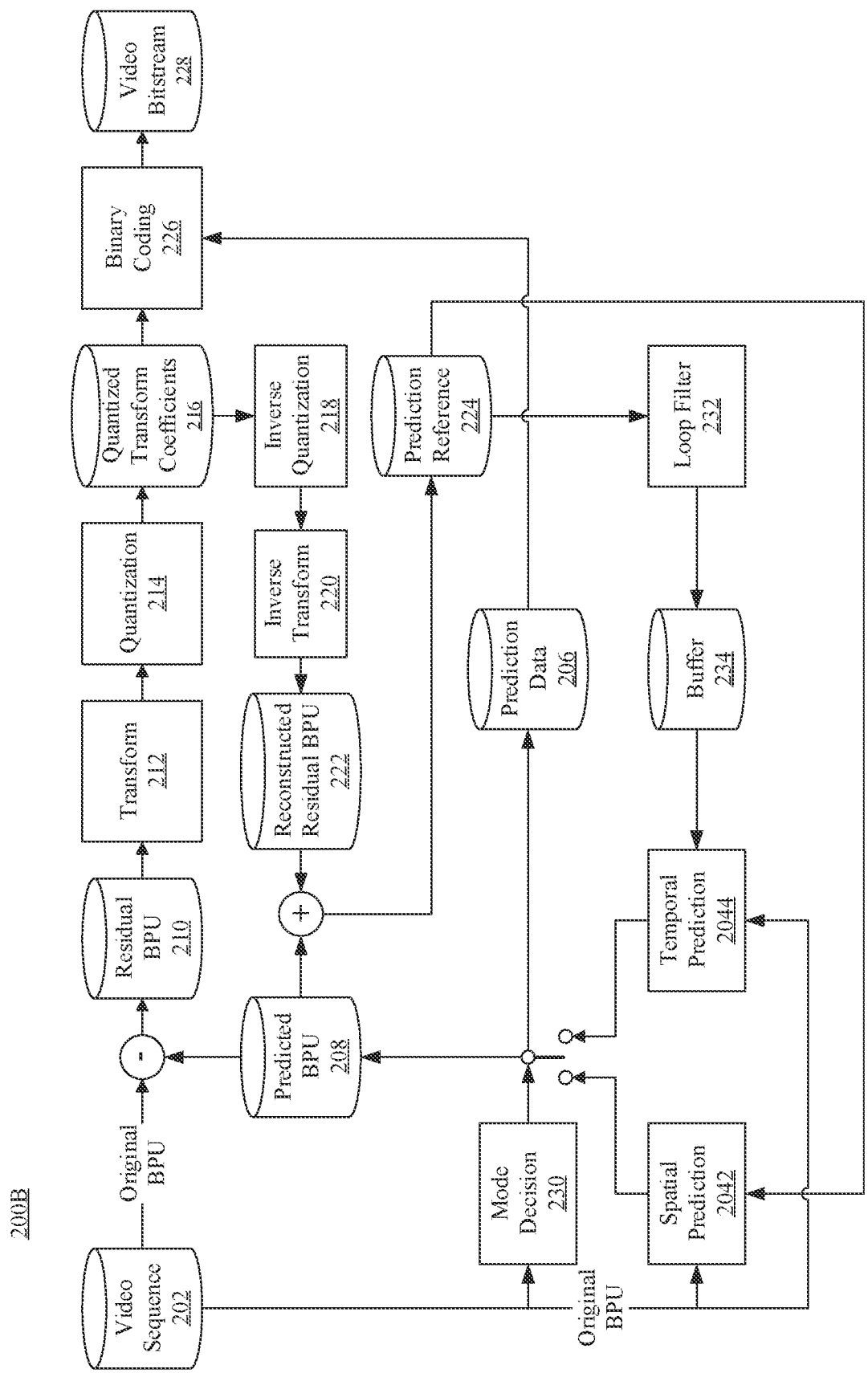
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
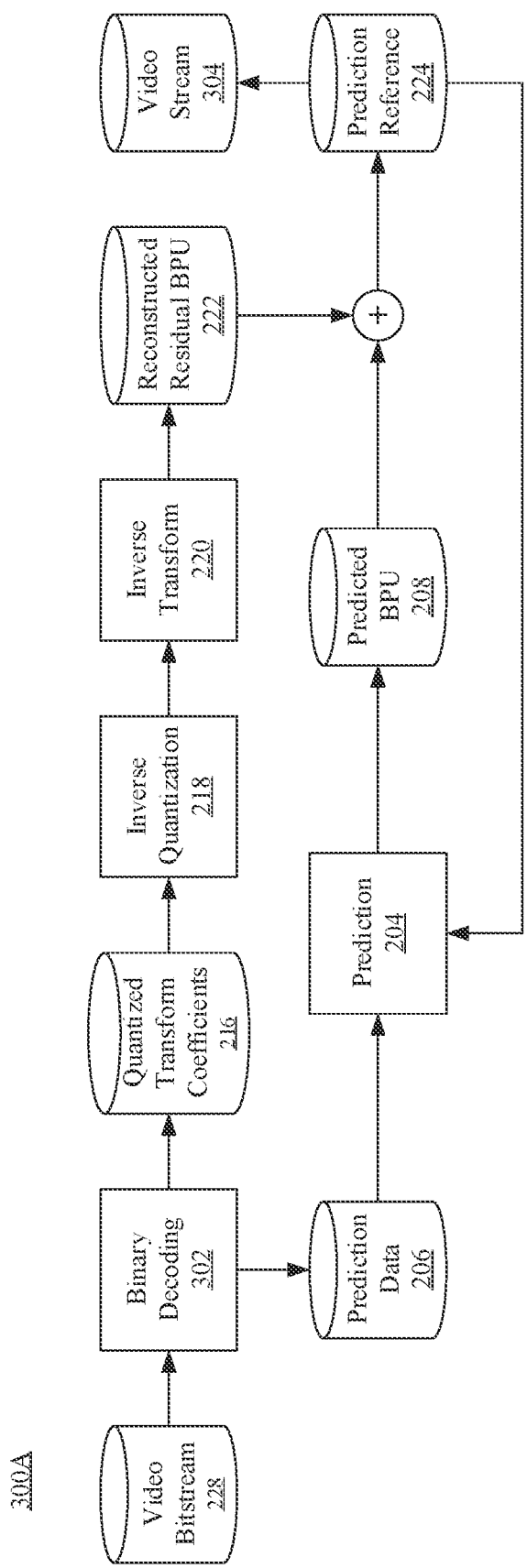
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
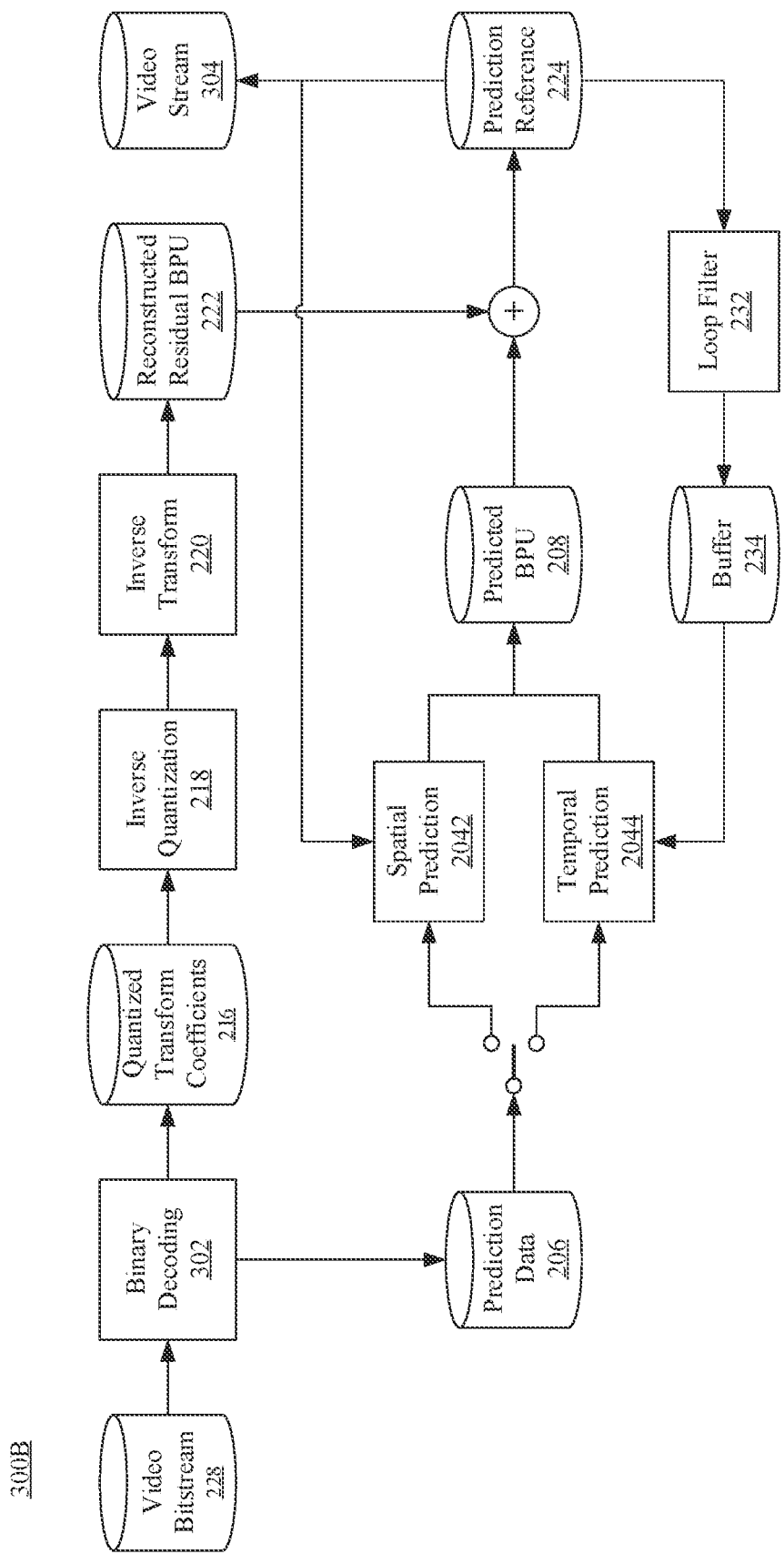
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
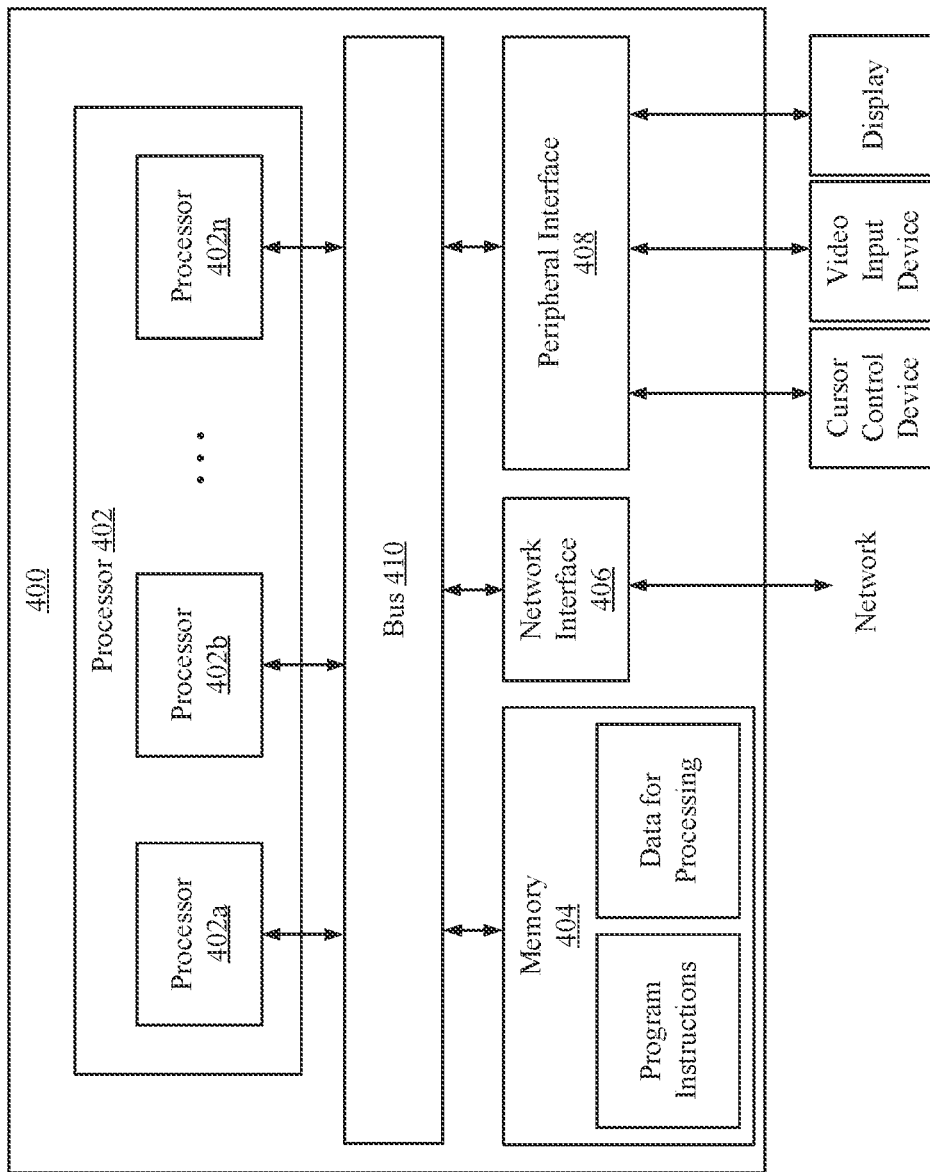
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In VVC decoding process, a coding tool called luma mapping with chroma scaling (LMCS) is added as a new processing block before the loop filters. LMCS has two main components. One component is in-loop mapping of the luma component based on adaptive piecewise linear models. The in-loop mapping of the luma component adjusts the dynamic range of the input signal by redistributing the codewords across the dynamic range to improve compression efficiency. The other component is applying luma-dependent chroma residual scaling to the chroma components. The chroma residual scaling is designed to compensate for the interaction between the luma signal and its corresponding chroma signals.

In VVC draft 8, signaling luma mapping with chroma scaling (LMCS) can be controlled in both picture and slice level. The LMCS syntax of picture header and slice header are shown in FIG. 5 and FIG. 6, respectively.

As shown in FIG. 5, when the picture level LMCS flag, ph_lmcs_enabled_flag, is equal to 0, it signals that both luma mapping and chroma residual scaling are disabled for all slices associated with the picture. If the ph_lmcs_enabled_flag is equal to 1 and ChromaArrayType is not equal to 0, an additional flag ph_chroma_residual_scale_flag is signaled. ph_chroma_residual_scale_flag specifies whether the chroma residual scaling is used in decoding the picture or not.

As shown in FIG. 6, if the ph_lmcs_enabled_flag is equal to 1, a slice level LMCS flag, slice_lmcs_enabled_flag, is signaled. Slice level LMCS flag slice_lmcs_enabled_flag being equal to 1 specifies that luma mapping is enabled for the slice associated with the slice header, and whether chroma scaling is used or not depends on the value of ph_chroma_residual_scale_flag. If slice_lmcs_enabled_flag is equal to 1 and ph_chroma_residual_scale_flag is equal to 1, chroma residual scaling is enabled for that slice. If slice_lmcs_enabled_flag is equal to 1 and ph_chroma_residual_scale_flag is equal to 0, chroma residual scaling is disabled for that slice.

Slice level LMCS flag slice_lmcs_enabled_flag being equal to 0 specifies that both luma mapping and chroma residual scaling are not enabled for the current slice.

The drawback of the VVC draft 8 is that if a picture contains multiple slices, the chroma residual scaling cannot be independently controlled for individual slice.

Figure 7:
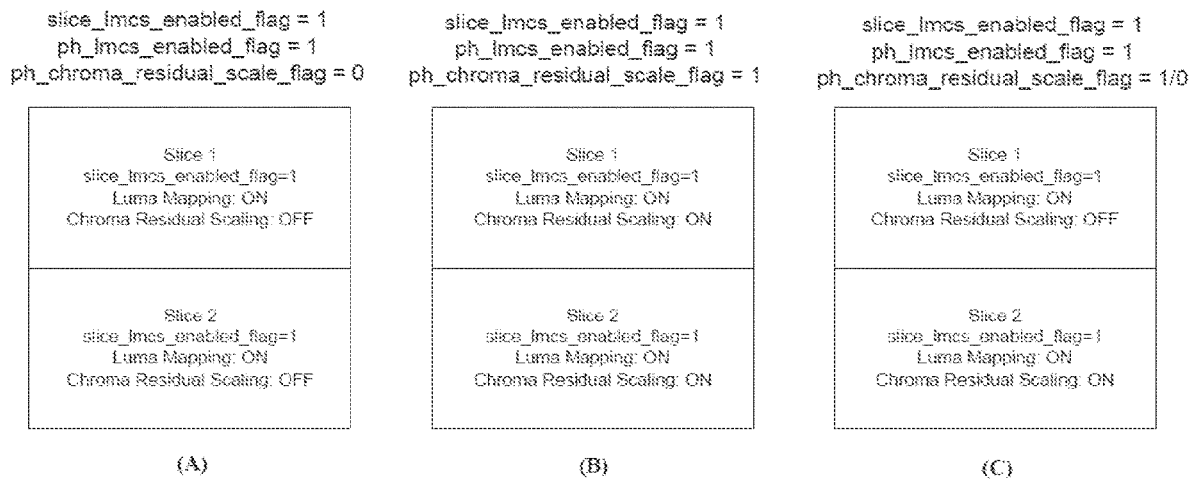
FIG. 7 illustrates examples of implementing the syntax shown in FIGS. 5 and 6, consistent with embodiments of the disclosure.

Specifically, using the syntax shown in FIG. 5 and FIG. 6, whether residual scaling is being used is consistent for all slices in a given picture. In other words, these slices are all on or all off. Consider an example in which there are two slices in a picture, both slices having LMCS enabled. In this example, the following combination is not supported:

Slice 1: Luma mapping ON, Chroma residual scaling OFF
Slice 2: Luma mapping ON, Chroma residual scaling ON FIG. 7 illustrates three examples of slice level LMCS control. Cases A, B, and C are illustrated in FIG. 7. In all three cases, the values of sps_lmcs_enabled_flag, ph_lmcs_enabled_flag, and slice_lmcs_enabled_flag are equal to 1. The picture level chroma residual scaling flag is equal to 0 in Case A and equal to 1 in Case B. In Case A, chroma residual scaling of both slice 1 and slice 2 are OFF since picture level ph_chroma_residual_scale_flag is equal to 0. In Case B, chroma residual scaling of both slices are ON since ph_chroma_residual_scale_flag is equal to 1. In Case C, chroma residual scaling of slice 1 and 2 are OFF and ON, respectively. The VVC draft 8 allows Case A and Case B, but does not allow Case C.

The present disclosure provides LMCS methods to solve the above-described drawback.

In some embodiments, the picture level chroma residual scaling flag(s) can be removed and replaced by a slice level chroma residual scaling flag. The disclosed method allows chroma residual scaling to be enabled or disabled in an individual slice for which LMCS is enabled in the picture level. The semantics of the newly added slice level chroma residual scaling flag are defined as follows: slice_chroma_residual_scale_flag equal to 1 specifies that chroma residual scaling is enabled for the slice; slice_chroma_residual_scale_flag equal to 0 specifies that chroma residual scaling is disabled for the slice. When slice_chroma_residual_scale_flag is not present, it is inferred to be equal to 0.

FIG. 8 and FIG. 9 show exemplary picture header syntax and slice header syntax of the above method, respectively. As shown in the picture header syntax in FIG. 8, the syntax element 301 (in VVC) is deleted. As shown in the picture header syntax in FIG. 9, the syntax element 401 is revised from VVC.

FIG. 10 illustrates a schematic diagram of slice level control of luma mapping and chroma residual scaling of the above exemplary method, according to some embodiments of the disclosure. Cases A, B, and C are illustrated in FIG. 10. Luma mapping is ON for all three cases. In Case A, chroma residual scaling is OFF for both slices 1 and 2. In Case B, chroma residual scaling is ON for both slices 1 and 2. In Case C, chroma residual coding of slice 1 is OFF and chroma residual scaling of slice 2 is ON. The syntax given in FIG. 8 and FIG. 9 allows all the three cases in FIG. 10, whereas VVC draft 8 allows only Case A and Case B in FIG. 10.

In some embodiments, the chroma residual scaling can be controlled both in the picture level and the slice level. Similar to VVC draft 8, ph_chroma_residual_scale_flag is signaled in the picture header. The semantics of ph_chroma_residual_scale_flag are defined as follows: ph_chroma_residual_scale_flag equal to 1 specifies that chroma residual scaling may be enabled for one or more slices associated with the picture header; and ph_chroma_residual_scale_flag equal to 0 specifies that chroma residual scaling is disabled for all slices associated with the picture header. When ph_chroma_residual_scale_flag is not present, it is inferred to be equal to 0.

The syntax of the picture header and the slice header are shown in FIG. 11 and FIG. 12, respectively. As shown in FIG. 11, the PH level syntax table is the same as in VVC draft 8. As shown by the syntax element 601 in FIG. 12, slice_chroma_residual_scale_flag is signaled if all of the following conditions are satisfied: slice_lmcs_enabled_flag is equal to 1; ChromaArrayType is not equal to 0; and ph_chroma_residual_scale_flag is equal to 1.

The semantics of the slice level chroma residual scaling flag are the same as those described above: slice_chroma_residual_scale_flag equal to 1 specifies that chroma residual scaling is enabled for the slice; and slice_chroma_residual_scale_flag equal to 0 specifies that chroma residual scaling is disabled for the slice. When slice_chroma_residual_scale_flag is not present, it is inferred to be equal to 0.

The benefit of the embodiment shown in FIG. 11 and FIG. 12 is that in the case of turning off chroma residual scaling for all slices associated with the PH, no slice level flag needs to be signaled, thus saving signaling overhead.

The above-described embodiments indicate that moving the LMCS syntax to the slice level allows enabling and disabling the chroma residual scaling for individual slices, and thus improve the granularity level of LMCS control. Consistent with the present disclosure, in some situations such as the following described embodiments, it may be beneficial to move the control syntax of chroma coding to the picture header.

In VVC draft 8, chroma de-blocking parameters (e.g., beta offsets and tc offsets) are signaled either in picture or in slice header, even if there is no chroma color component in the picture. However, if there is no chroma color component in the picture, it is not required to signal chroma de-blocking parameters.

Embodiments of the disclosure provide methods for processing video content with signaling of chroma de-blocking parameters.

In some embodiments, the chroma de-blocking parameters are only signaled if the chroma components exists in the video sequence (that is, the video sequence is not monochrome). FIG. 13 and FIG. 14 respectively show exemplary picture header syntax and slice header syntax for signaling chroma de-blocking parameters. As shown in FIG. 13 and FIG. 14, the proposed changes to the syntax in VVC draft 8 are marked by the dash-line boxes. These figures show that the beta offset and tc offset of Cb and Cr are only signaled if ChromaArrayType !=0. The detail definition of ChromaArrayType can be found in VVC draft 8, which is incorporated in the present disclosure by reference.

In the embodiments shown in FIG. 13 and FIG. 14, the chroma de-blocking parameters of the PPS syntax are signaled only if ChromaArrayType is not equal to 0. Because the value of ChromaArrayType is only available after decoding SPS syntax, the reliance on ChromaArrayType introduces additional dependency on SPS, which is not desirable. To avoid the SPS/PPS dependency, it is proposed to signal separate_colour_plane_flag and chroma_format_idc not only in SPS but also in PPS. For example, two additional flags can be introduced, and their semantics are given below.

Flag pps_separate_colour_plane_flag being equal to 1 specifies that the three colour components of the 4:4:4 chroma format are coded separately. Flag pps_separate_colour_plane_flag being equal to 0 specifies that the colour components are not coded separately. The value of pps_separate_colour_plane_flag is equal to the value of separate_colour_plane_flag.

Parameter pps_chroma_format_idc specifies the chroma sampling relative to the luma sampling. The value of pps_chroma_format_idc is equal to the value of chroma_format_idc.

Depending on the value of pps_separate_colour_plane_flag, the value of the variable ChromaArrayType can be assigned as follows: if pps_separate_colour_plane_flag is equal to 0, ChromaArrayType is set equal to pps_chroma_format_idc; otherwise (pps_separate_colour_plane_flag is equal to 1), ChromaArrayType is set equal to 0.

FIG. 15 shows exemplary PPS syntax for signaling the pps_separate_colour_plane_flag and pps_chroma_format_idc. The syntax elements shown in the dash-line boxes are changes to the syntax in VVC draft 8.

In some embodiments, in addition to the signaling of pps_separate_colour_plane_flag and pps_chroma_format_idc in PPS, the signaling of pps_chroma_tool_offsets_present_flag can be skipped. FIG. 16 shows exemplary PPS syntax without using pps_chroma_tool_offsets_present_flag. The syntax elements shown in the dash-line boxes are changes to the syntax in VVC draft 8.

In some embodiments, the PPS syntax pps_chroma_tool_offsets_present_flag can be replaced by pps_chroma_tool_present_flag. In these embodiments, all of the chroma related syntax in PPS are signaled if pps_chroma_tool_present_flag is equal to 1. Similar to VVC draft 8, separate_colour_plane_flag and chroma_format_idc are only signaled in SPS and are not signaled in PPS.

The semantics of the pps_chroma_tool_present_flag are given as follows: flag pps_chroma_tool_present_flag being equal to 1 specifies that chroma tool related syntax elements are present in the PPS raw byte sequence payload (RBSP) syntax structure; and flag pps_chroma_tool_present_flag being equal to 0 specifies that chroma tool offsets related syntax elements are not present in in the PPS RBSP syntax structure. When ChromaArrayType is equal to 0, the value of pps_chroma_tool_present_flag shall be equal to 0.

FIG. 17 shows exemplary PPS syntax using the proposed pps_chroma_tool_present_flag. The syntax elements in the dash-line boxes are changes to the syntax in VVC draft 8. It is shown that the chroma related syntax are signaled if pps_chroma_tool_present_flag is not equal to 0. Similar to VVC draft 8, separate_colour_plane_flag and chroma_format_idc are only signaled in SPS and are not signaled in PPS.

In some embodiments, the signaling of the slice level chroma deblocking parameters, such as slice_cb_beta_offset_div2, slice_cb_tc_offset_div2, slice_cr_beta_offset_div2, and slice_cb_beta_offset_div2, depends on the value of pps_chroma_tool_present_flag. If pps_chroma_tool_present_flag is equal to 0, slice_cb_beta_offset_div2, slice_cb_tc_offset_div2, slice_cr_beta_offset_div2, and slice_cb_beta_offset_div2 are not signaled. If pps_chroma_tool_present_flag is equal to 1, slice_cb_beta_offset_div2, slice_cb_tc_offset_div2, slice_cr_beta_offset_div2, or slice_cb_beta_offset_div2 are signaled.

In some embodiments, the signaling of picture level chroma deblocking parameters, such as ph_cb_beta_offset_div2, ph_cb_tc_offset_div2, ph_cr_beta_offset_div2, and ph_cb_beta_offset_div2, depends on the value of pps_chroma_tool_present_flag. If pps_chroma_tool_present_flag is equal to 0, ph_cb_beta_offset_div2, ph_cb_tc_offset_div2, ph_cr_beta_offset_div2, and ph_cb_beta_offset_div2 are not signaled. If pps_chroma_tool_present_flag is equal to 1, ph_cb_beta_offset_div2, ph_cb_tc_offset_div2, ph_cr_beta_offset_div2, or ph_cb_beta_offset_div2 are signaled.

Figure 18:
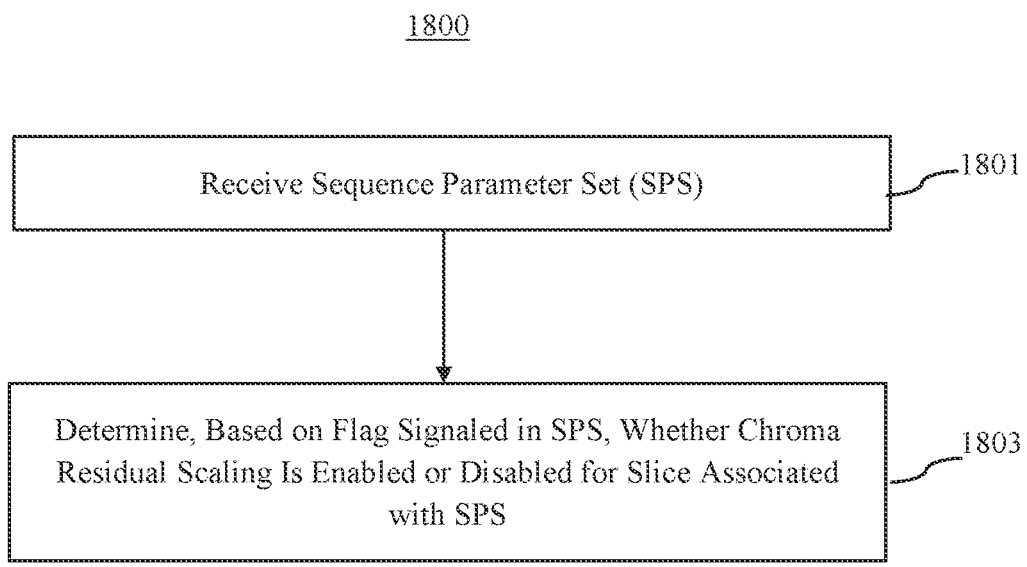
FIG. 18 is a flowchart of an exemplary method for signaling LMCS parameters, consistent with embodiments of the disclosure.

FIG. 18 is a flowchart of an exemplary method 1800 for signaling LMCS parameters, consistent with the embodiments described in connection with FIGS. 5-12. In some embodiments, method 1800 can be performed by a decoder, and one or more software or hardware components of an apparatus (e.g., apparatus 400 of FIG. 4). For example, a processor (e.g., processor 402 of FIG. 4) can perform method 1800. In some embodiments, method 1800 can be implemented by a computer program product, embodied in a computer-readable medium, including computer-executable instructions, such as program code, executed by computers (e.g., apparatus 400 of FIG. 4). As shown in FIG. 18, the method can include the following steps.

In step 1801, a bitstream including coded video data is received. The bitstream includes at least one Sequence Parameter Sets (SPS).

In step 1803, based on an SPS-level chroma scaling flag (e.g., slice_chroma_residual_scale_flag) signaled in the received SPS, it is determined whether chroma residual scaling is enabled or disabled for a slice associated with the SPS. If the flag has a value equal to 1, it is determined that the chroma residual scaling is enabled for the slice. If the flag has a value equal to 0, it is determined that the chroma residual scaling is disabled for the slice.

Figure 19:
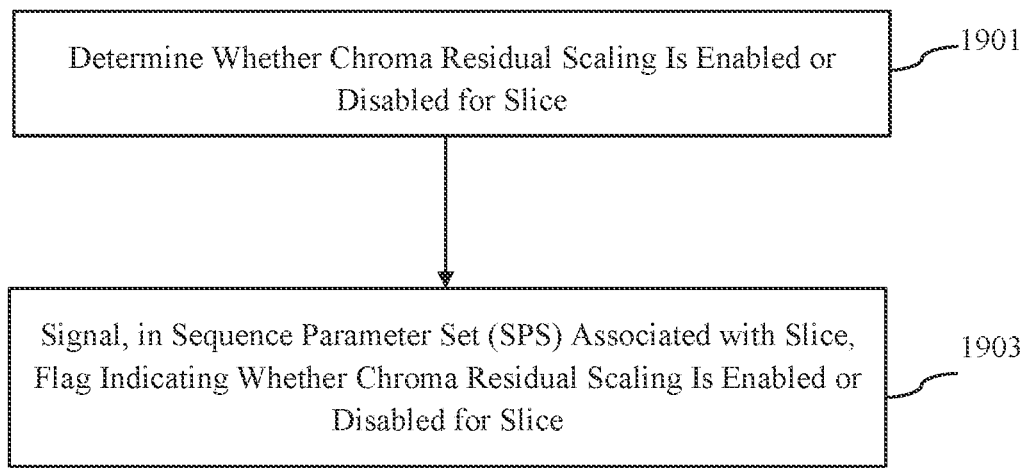
FIG. 19 is a flowchart of an exemplary method for signaling LMCS parameters, consistent with embodiments of the disclosure.

FIG. 19 is a flowchart of an exemplary method 1900 for signaling LMCS parameters, consistent with the embodiments described in connection with FIGS. 5-12. In some embodiments, method 1900 can be performed by an encoder, and one or more software or hardware components of an apparatus (e.g., apparatus 400 of FIG. 4). For example, a processor (e.g., processor 402 of FIG. 4) can perform method 1900. In some embodiments, method 1900 can be implemented by a computer program product, embodied in a computer-readable medium, including computer-executable instructions, such as program code, executed by computers (e.g., apparatus 400 of FIG. 4). As shown in FIG. 19, method 1900 can include the following steps.

In step 1901, it is determined whether chroma residual scaling is enabled or disabled for a slice.

In step 1903, based on the determination result, a flag (e.g., slice_chroma_residual_scale_flag) is signaled in a sequence parameter set (SPS) associated with the slice, to indicate whether chroma residual scaling is enabled or disabled for the slice. If chroma residual scaling is enabled for the slice, the value of the flag is set to be 1. If chroma residual scaling is disabled for the slice, the value of the flag is set to be 0.

Figure 20:
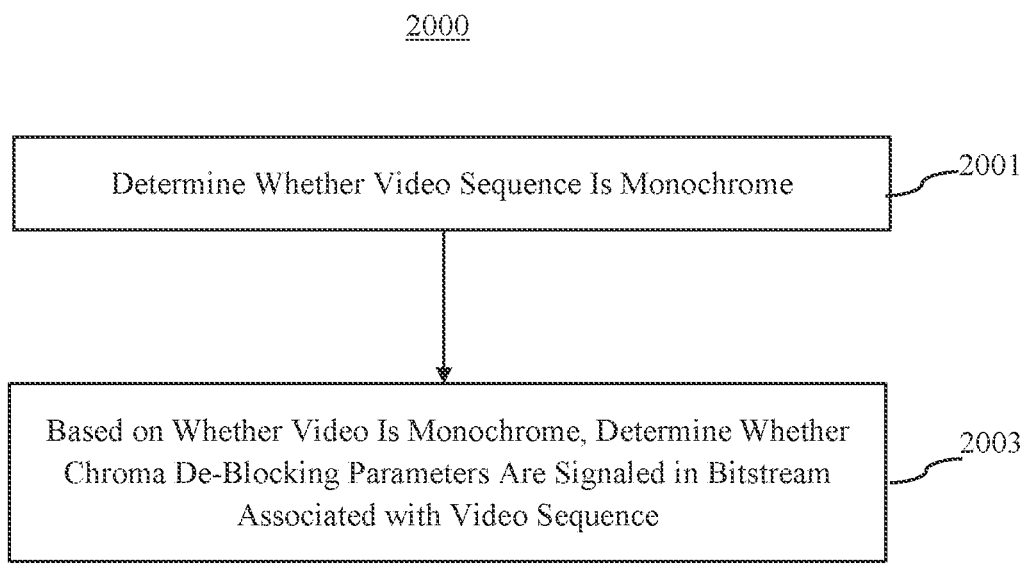
FIG. 20 is a flowchart of an exemplary method for signaling chroma de-blocking parameters, consistent with embodiments of the disclosure.

FIG. 20 is a flowchart of an exemplary method 2000 for signaling chroma de-blocking parameters, consistent with the embodiments described in connection with FIGS. 13-17. In some embodiments, method 2000 can be performed by an encoder, a decoder, and one or more software or hardware components of an apparatus (e.g., apparatus 400 of FIG. 4). For example, a processor (e.g., processor 402 of FIG. 4) can perform method 2000. In some embodiments, method 2000 can be implemented by a computer program product, embodied in a computer-readable medium, including computer-executable instructions, such as program code, executed by computers (e.g., apparatus 400 of FIG. 4). As shown in FIG. 20, method 2000 can include the following steps.

In step 2001, it is determined whether a video sequence is monochrome.

In step 2003, if the video sequence is not monochrome, it is determined that chroma de-blocking parameters are signaled in a bitstream associated with the video sequence; whereas if the video sequence is monochrome, it is determined that no chroma de-blocking parameter is signaled in the bitstream.

The embodiments may further be described using the following clauses:

1. A computer-implemented video decoding method, comprising:
receiving a sequence parameter set (SPS); and
determining, based on a first flag signaled in the SPS, whether chroma residual scaling is enabled or disabled for a slice associated with the SPS.

2. The method according to clause 1, further comprising:
in response to a value of the first flag being equal to 1, determining that the chroma residual scaling is enabled for the slice.

3. The method according to any one of clauses 1 and 2, further comprising:
in response to a value of the first flag being equal to 0, determining that the chroma residual scaling is disabled for the slice.

4. The method according to any one of clauses 1-3, further comprising:
receiving a second SPS; and
when the first flag is not present in the second SPS, determining that the chroma residual scaling is disabled for a slice associated with the second SPS.

5. The method according to any one of clauses 1-4, wherein the first flag is signaled based on a second flag signaled in a picture header associated with the slice.

6. The method according to clause 5, wherein:
a first value of the second flag indicates that the chroma residual scaling is enabled for one or more slices associated with the picture header; and
a second value of the second flag indicates that the chroma residual scaling is disabled for all slices associated with the picture header.

7. The method according to any one of clauses 1-4, comprising:
receiving a picture header; and
in response to a second flag signaled in the picture header having a first value, determining that the chroma residual scaling is disabled for all slices associated with the picture header.

8. The method according to any one of clauses 1-4, comprising:
determining, based on a second flag signaled in the SPS, whether luma mapping is enabled or disabled for the slice.

9. A computer-implemented video encoding method, comprising:
signaling, in a sequence parameter set (SPS) associated with a slice, a first flag indicating whether chroma residual scaling is enabled or disabled for the slice.

10. The method according to clause 9, comprising:
in response to the chroma residual scaling being enabled for the slice, setting a value of the first flag to be 1.

11. The method according to any one of clauses 9 and 10, comprising:
in response to the chroma residual scaling being disabled for the slice, setting a value of the first flag to be 0.

12. The method according to any one of clauses 9-11, further comprising:
signaling, in a picture header, a second flag indicating whether the chroma residual scaling is enabled for a picture associated with the picture header.

13. The method according to clause 12, wherein the slice is part of the picture, and the signaling of the first flag is in response to a value of the second flag being equal to 1, wherein the first flag is not signaled in the SPS if the value of the second flag is equal to 0.

14. The method according to any one of clauses 9-11, further comprising:
signaling, in the SPS, a second flag indicating whether luma mapping is enabled or disabled for the slice.

15. A video decoder, comprising:
a memory for storing a set of instructions; and
at least one processor configured to execute the set of instructions to cause the system to perform:
receiving a sequence parameter set (SPS); and
determining, based on a first flag signaled in the SPS, whether chroma residual scaling is enabled or disabled for a slice associated with the SPS.

16. The video decoder according to clause 15, wherein the at least one processor is configured to execute the set of instructions to cause the system to perform:
in response to a value of the first flag being equal to 1, determining that the chroma residual scaling is enabled for the slice.

17. The video decoder according to any one of clauses 15 and 16, wherein the at least one processor is configured to execute the set of instructions to cause the system to perform:
in response to a value of the first flag being equal to 0, determining that the chroma residual scaling is disabled for the slice.

18. The video decoder according to any one of clauses 15-17, wherein the at least one processor is configured to execute the set of instructions to cause the system to perform:
receiving a second SPS; and
when the first flag is not present in the second SPS, determining that the chroma residual scaling is disabled for a slice associated with the second SPS.

19. The video decoder according to any one of clauses 15-18, wherein the first flag is signaled based on a second flag signaled in a picture header associated with the slice.

20. The video decoder according to clause 19, wherein:
a first value of the second flag indicates that the chroma residual scaling is enabled for one or more slices associated with the picture header; and
a second value of the second flag indicates that the chroma residual scaling is disabled for all slices associated with the picture header.

21. The video decoder according to any one of clauses 15-18, wherein the at least one processor is configured to execute the set of instructions to cause the system to perform:
receiving a picture header; and
in response to a second flag signaled in the picture header having a first value, determining that the chroma residual scaling is disabled for all slices associated with the picture header.

22. The video decoder according to any one of clauses 15-18, wherein the at least one processor is configured to execute the set of instructions to cause the system to perform:
determining, based on a second flag signaled in the SPS, whether luma mapping is enabled or disabled for the slice.

23. A video encoder, comprising:
a memory for storing a set of instructions; and
at least one processor configured to execute the set of instructions to cause the system to perform:
signaling, in a sequence parameter set (SPS) associated with a slice, a first flag indicating whether chroma residual scaling is enabled or disabled for the slice.

24. The video encoder according to clause 23, wherein the at least one processor is configured to execute the set of instructions to cause the system to perform:
in response to the chroma residual scaling being enabled for the slice, setting a value of the first flag to be 1.

25. The video encoder according to any one of clauses 23 and 24, wherein the at least one processor is configured to execute the set of instructions to cause the system to perform: in response to the chroma residual scaling being disabled for the slice, setting a value of the first flag to be 0.

26. The video encoder according to any one of clauses 23-25, wherein the at least one processor is configured to execute the set of instructions to cause the system to perform: signaling, in a picture header, a second flag indicating whether the chroma residual scaling is enabled for a picture associated with the picture header.

27. The video encoder according to clause 26, wherein the slice is part of the picture, and the signaling of the first flag is in response to a value of the second flag being equal to 1, wherein the first flag is not signaled in the SPS if the value of the second flag is equal to 0.

28. The video encoder according to any one of clauses 23-25, wherein the at least one processor is configured to execute the set of instructions to cause the system to perform: signaling, in the SPS, a second flag indicating whether luma mapping is enabled or disabled for the slice.

29. A non-transitory computer readable medium that stores a set of instructions that is executable by at least one processor of a computer system to cause the computer system to perform a method for decoding video content, the method comprising:
receiving a sequence parameter set (SPS); and
determining, based on a first flag signaled in the SPS, whether chroma residual scaling is enabled or disabled for a slice associated with the SPS.

30. The non-transitory computer readable medium according to clause 29, wherein the set of instructions further causes the at least one processor to perform.
in response to a value of the first flag being equal to 1, determining that the chroma residual scaling is enabled for the slice.

31. The non-transitory computer readable medium according to any one of clauses 29 and 30, wherein the set of instructions further causes the at least one processor to perform:
in response to a value of the first flag being equal to 0, determining that the chroma residual scaling is disabled for the slice.

32. The non-transitory computer readable medium according to any one of clauses 29-31, wherein the set of instructions further causes the at least one processor to perform:
receiving a second SPS; and
when the first flag is not present in the second SPS, determining that the chroma residual scaling is disabled for a slice associated with the second SPS.

33. The non-transitory computer readable medium according to any one of clauses 29-32, wherein the first flag is signaled based on a second flag signaled in a picture header associated with the slice.

34. The non-transitory computer readable medium according to clause 33, wherein.
a first value of the second flag indicates that the chroma residual scaling is enabled for one or more slices associated with the picture header; and
a second value of the second flag indicates that the chroma residual scaling is disabled for all slices associated with the picture header.

35. The non-transitory computer readable medium according to any one of clauses 29-32, wherein the set of instructions further causes the at least one processor to perform:
receiving a picture header; and
in response to a second flag signaled in the picture header having a first value, determining that the chroma residual scaling is disabled for all slices associated with the picture header.

36. The non-transitory computer readable medium according to any one of clauses 29-32, wherein the set of instructions further causes the at least one processor to perform:
determining, based on a second flag signaled in the SPS, whether luma mapping is enabled or disabled for the slice.

37. A non-transitory computer readable medium that stores a set of instructions that is executable by at least one processor of a computer system to cause the computer system to perform a method for encoding video content, the method comprising:
signaling, in a sequence parameter set (SPS) associated with a slice, a first flag indicating whether chroma residual scaling is enabled or disabled for the slice.

38. The non-transitory computer readable medium according to clause 37, wherein the set of instructions further causes the at least one processor to perform:
in response to the chroma residual scaling being enabled for the slice, setting a value of the first flag to be 1.

39. The non-transitory computer readable medium according to any one of clauses 37 and 38, wherein the set of instructions further causes the at least one processor to perform:
in response to the chroma residual scaling being disabled for the slice, setting a value of the first flag to be 0.

40. The non-transitory computer readable medium according to any one of clauses 37-39, wherein the set of instructions further causes the at least one processor to perform:
signaling, in a picture header, a second flag indicating whether the chroma residual scaling is enabled for a picture associated with the picture header.

41. The non-transitory computer readable medium according to clause 40, wherein the slice is part of the picture, and the signaling of the first flag is in response to a value of the second flag being equal to 1, wherein the first flag is not signaled in the SPS if the value of the second flag is equal to 0.

42. The non-transitory computer readable medium according to any one of clauses 37-39, wherein the set of instructions further causes the at least one processor to perform:
signaling, in the SPS, a second flag indicating whether luma mapping is enabled or disabled for the slice.

43. A computer-implemented method for process video content, comprising:
determining whether a video sequence is monochrome; and
in response to a determination that the video sequence is not monochrome, signaling chroma de-blocking parameters in a bitstream associated with the video sequence,
wherein when the video sequence is monochrome, no chroma de-blocking parameter is signaled in the bitstream.

44. The method according to clause 43, wherein the chroma de-blocking parameters are signaled in a picture header.

45. The method according to any one of clauses 43 and 44, wherein the chroma de-blocking parameters are signaled in a slice header.

46. The method according to any one of clauses 43-45, wherein the determining of whether the video sequence is monochrome is based on a value of ChromaArrayType.

47. The method according to clause 46, further comprising:
signaling, in a picture parameter set (PPS) associated with the video sequence, a first flag indicating whether the video sequence comprises a plurality of separately coded color components, and a second flag indicating information regarding chroma sampling relative to luma sampling.

48. The method according to clause 47, further comprising:
in response to a value of the first flag being equal to 0, setting ChromaArrayType to be equal to a value of the second flag.

49. The method according to clause 47, further comprising:
in response to a value of the first flag being equal to 1, setting ChromaArrayType to be equal to 0.

50. The method according to any one of clauses 43-49, further comprising:
signaling, in a PPS associated with the video sequence, a flag indicating a PPS raw byte sequence payload (RBSP) syntax structure comprises chroma tool related syntax.

51. The method according to clause 50, wherein the flag is pps_chroma_tool_present_flag.

52. The method according to clause 51, further comprising:
in response to the pps_chroma_tool_present_flag being equal to 1, signaling one or more slice level chroma de-blocking parameters,
wherein when the pps_chroma_tool_present_flag is equal to 0, no slice level chroma de-blocking parameter is signaled.

53. The method according to clause 52, wherein the one or more slice level chroma de-blocking parameters include:
slice_cb_beta_offset_div2, slice_cb_tc_offset_div2, slice_cr_beta_offset_div2, or slice_cb_beta_offset_div2.

54. The method according to clause 51, further comprising:
in response to the pps_chroma_tool_present_flag being equal to 1, signaling one or more picture level chroma de-blocking parameters,
wherein when the pps_chroma_tool_present_flag is equal to 0, no picture level chroma de-blocking parameter is signaled.

55. The method according to clause 54, wherein the one or more slice level chroma de-blocking parameters include:
ph_cb_beta_offset_div2, ph_cb_tc_offset_div2, ph_cr_beta_offset_div2, and ph_cb_beta_offset_div2.

56. An apparatus, comprising:
a memory for storing a set of instructions; and
at least one processor configured to execute the set of instructions to cause the system to perform:
determining whether a video sequence is monochrome: and
in response to a determination that the video sequence is not monochrome, signaling chroma de-blocking parameters in a bitstream associated with the video sequence,
wherein when the video sequence is monochrome, no chroma de-blocking parameter is signaled in the bitstream.

57. The apparatus according to clause 51, wherein the at least one processor is configured to execute the set of instructions to cause the system to perform:
signaling the chroma de-blocking parameters in a picture header.

58. The apparatus according to any one of clauses 51 and 52, wherein the at least one processor is configured to execute the set of instructions to cause the system to perform:
signaling the chroma de-blocking parameters in a slice header.

59. The apparatus according to any one of clauses 51-53, wherein the determining of whether the video sequence is monochrome is based on a value of ChromaArrayType.

60. The apparatus according to clause 54, wherein the at least one processor is configured to execute the set of instructions to cause the system to perform:
signaling, in a picture parameter set (PPS) associated with the video sequence, a first flag indicating whether the video sequence comprises a plurality of separately coded color components, and a second flag indicating information regarding chroma sampling relative to luma sampling.

61. The apparatus according to clause 55, wherein the at least one processor is configured to execute the set of instructions to cause the system to perform:
in response to a value of the first flag being equal to 0, setting ChromaArrayType to be equal to a value of the second flag.

62. The apparatus according to clause 55, wherein the at least one processor is configured to execute the set of instructions to cause the system to perform:
in response to a value of the first flag being equal to 1, setting ChromaArrayType to be equal to 0.

63. The apparatus according to any one of clauses 51-57, wherein the at least one processor is configured to execute the set of instructions to cause the system to perform:
signaling, in a PPS associated with the video sequence, a flag indicating a PPS raw byte sequence payload (RBSP) syntax structure comprises chroma tool related syntax.

64. The apparatus according to clause 63, wherein the flag is pps_chroma_tool_present_flag.

65. The apparatus according to clause 64, wherein the at least one processor is configured to execute the set of instructions to cause the system to perform:
in response to the pps_chroma_tool_present_flag being equal to 1, signaling one or more slice level chroma de-blocking parameters,
wherein when the pps_chroma_tool_present_flag is equal to 0, no slice level chroma de-blocking parameter is signaled.

66. The apparatus according to clause 65, wherein the one or more slice level chroma de-blocking parameters include:
slice_cb_beta_offset_div2, slice_cb_tc_offset_div2, slice_cr_beta_offset_div2, or slice_cb_beta_offset_div2.

67. The apparatus according to clause 64, wherein the at least one processor is configured to execute the set of instructions to cause the system to perform:
in response to the pps_chroma_tool_present_flag being equal to 1, signaling one or more picture level chroma de-blocking parameters,
wherein when the pps_chroma_tool_present_flag is equal to 0, no picture level chroma de-blocking parameter is signaled.

68. The apparatus according to clause 67, wherein the one or more slice level chroma de-blocking parameters include: ph_cb_beta_offset_div2, ph_cb_tc_offset_div2, ph_cr_beta_offset_div2, and ph_cb_beta_offset_div2.

69. A non-transitory computer readable medium that stores a set of instructions that is executable by at least one processor of a computer system to cause the computer system to perform a method comprising:
  determining whether a video sequence is monochrome; and
  in response to a determination that the video sequence is not monochrome, signaling chroma de-blocking parameters in a bitstream associated with the video sequence,
  wherein when the video sequence is monochrome, no chroma de-blocking parameter is signaled in the bitstream.

70. The non-transitory computer readable medium according to clause 59, wherein the set of instructions further causes the at least one processor to perform:
  signaling the chroma de-blocking parameters in a picture header.

71. The non-transitory computer readable medium according to any one of clauses 59 and 60, wherein the set of instructions further causes the at least one processor to perform: signaling the chroma de-blocking parameters in a slice header.

72. The non-transitory computer readable medium according to any one of clauses 59-61, wherein the determining of whether the video sequence is monochrome is based on a value of ChromaArrayType.

73. The non-transitory computer readable medium according to clause 62, wherein the set of instructions further causes the at least one processor to perform:
  signaling, in a picture parameter set (PPS) associated with the video sequence, a first flag indicating whether the video sequence comprises a plurality of separately coded color components, and a second flag indicating information regarding chroma sampling relative to luma sampling.

74. The non-transitory computer readable medium according to clause 63, wherein the set of instructions further causes the at least one processor to perform:
  in response to a value of the first flag being equal to 0, setting ChromaArrayType to be equal to a value of the second flag.

75. The non-transitory computer readable medium according to clause 63, wherein the set of instructions further causes the at least one processor to perform.
  in response to a value of the first flag being equal to 1, setting ChromaArrayType to be equal to 0.

76. The non-transitory computer readable medium according to any one of clauses 59-65, wherein the set of instructions further causes the at least one processor to perform: signaling, in a PPS associated with the video sequence, a flag indicating a PPS raw byte sequence payload (RBSP) syntax structure comprises chroma tool related syntax.

77. The non-transitory computer readable medium according to clause 76, wherein the flag is pps_chroma_tool_present_flag.

78. The non-transitory computer readable medium according to clause 77, wherein the set of instructions further causes the at least one processor to perform:
  in response to the pps_chroma_tool_present_flag being equal to 1, signaling one or more slice level chroma de-blocking parameters,
  wherein when the pps_chroma_tool_present_flag is equal to 0, no slice level chroma de-blocking parameter is signaled.

79. The non-transitory computer readable medium according to clause 78, wherein the one or more slice level chroma de-blocking parameters include:
  slice_cb_beta_offset_div2, slice_cb_tc_offset_div2, slice_cr_beta_offset_div2, or slice_cb_beta_offset_div2.

80. The non-transitory computer readable medium according to clause 77, wherein the set of instructions further causes the at least one processor to perform:
  in response to the pps_chroma_tool_present_flag being equal to 1, signaling one or more picture level chroma de-blocking parameters,
  wherein when the pps_chroma_tool_present_flag is equal to 0, no picture level chroma de-blocking parameter is signaled.

81. The non-transitory computer readable medium according to clause 80, wherein the one or more slice level chroma de-blocking parameters include:
  ph_cb_beta_offset_div2, ph_cb_tc_offset_div2, ph_cr_beta_offset_div2, and ph_cb_beta_offset_div2.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented decoding method, comprising:
    determining a value of a pps_chroma_tool_offsets_present_flag signaled in a picture parameter set (PPS) associated with a video sequence; and
    in response to the value of the pps_chroma_tool_offsets_present_flag being equal to 1, decoding one or more picture level chroma de-blocking parameters in a bitstream associated with the video sequence,
    wherein when the value of the pps_chroma_tool_offsets_present_flag is equal to 0, no picture level chroma de-blocking parameter is signaled in the bitstream, and
    wherein the one or more picture level chroma de-blocking parameters comprise at least one of a beta offset or a tc offset.

2. The method according to claim 1, wherein the one or more picture level chroma de-blocking parameters include: ph_cb_beta_offset_div2, ph_cb_tc_offset_div2, ph_cr_beta_offset_div2, or ph_cr_tc_offset_div2.

3. A non-transitory computer readable medium storing a bitstream, wherein the bitstream comprises:
    a picture parameter set (PPS) associated with a video sequence, the PPS comprising a pps_chroma_tool_offsets_present_flag indicating whether chroma de-blocking parameters are signaled in the bitstream,
    wherein when a value of the pps_chroma_tool_offsets_present_flag is equal to 1, the bitstream comprises one or more picture level chroma de-blocking parameters,
    wherein when the value of the pps_chroma_tool_offsets_present_flag is equal to 0, the bitstream does not comprise the one or more picture level chroma de-blocking parameters, and
    wherein the one or more picture level chroma de-blocking parameters comprise at least one of a beta offset or a tc offset.

4. The non-transitory computer readable medium according to claim 3, wherein the one or more picture level chroma de-blocking parameters include:
    ph_cb_beta_offset_div2, ph_cb_tc_offset_div2, ph_cr_beta_offset_div2, or ph_cr_tc_offset_div2.

5. A computer-implemented encoding method, comprising:
    determining a value of a pps_chroma_tool_offsets_present_flag signaled in a picture parameter set (PPS) associated with a video sequence; and
    in response to the value of the pps_chroma_tool_offsets_present_flag being equal to 1, signaling one or more picture level chroma de-blocking parameters in a bitstream associated with the video sequence,
    wherein when the value of the pps_chroma_tool_offsets_present_flag is equal to 0, no picture level chroma de-blocking parameter is signaled in the bitstream, and
    wherein the one or more picture level chroma de-blocking parameters comprise at least one of a beta offset or a tc offset.

6. The method according to claim 5, wherein the chroma de-blocking parameters are signaled in a picture header.

7. The method according to claim 5, wherein the one or more picture level chroma de-blocking parameters include: ph_cb_beta_offset_div2, ph_cb_tc_offset_div2, ph_cr_beta_offset_div2, or ph_cr_tc_offset_div2.

* * * * *